United States Patent
Tyrrell et al.

(10) Patent No.: US 11,724,738 B2
(45) Date of Patent: Aug. 15, 2023

(54) VEHICLE STEERING SYSTEM

(71) Applicant: Jaguar Land Rover Limited, Coventry (GB)

(72) Inventors: Oliver Tyrrell, Coventry (GB); Brian Smith, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 457 days.

(21) Appl. No.: 16/072,388

(22) PCT Filed: Apr. 6, 2017

(86) PCT No.: PCT/EP2017/058252
§ 371 (c)(1),
(2) Date: Jul. 24, 2018

(87) PCT Pub. No.: WO2017/178330
PCT Pub. Date: Oct. 19, 2017

(65) Prior Publication Data
US 2019/0023319 A1  Jan. 24, 2019

(30) Foreign Application Priority Data

Apr. 15, 2016 (GB) .................................. 1606616

(51) Int. Cl.
  *B62D 15/02* (2006.01)
  *B62D 5/04* (2006.01)
  *B62D 6/00* (2006.01)
(52) U.S. Cl.
  CPC ......... *B62D 15/025* (2013.01); *B62D 5/0463* (2013.01); *B62D 6/003* (2013.01); *B62D 5/0421* (2013.01)

(58) Field of Classification Search
  CPC .. B62D 5/0421; B62D 5/0457; B62D 5/0463; B62D 6/00; B62D 6/002; B62D 6/003;
  (Continued)

(56) References Cited

U.S. PATENT DOCUMENTS 9,031,747 B2 * 5/2015 Benyo .................. B62D 5/0463
  701/42
9,481,393 B1 * 11/2016 Meyerhoffer ........... F16D 48/06
  (Continued)

FOREIGN PATENT DOCUMENTS

EP   2 591 983 A1   5/2013
JP   3704242 B2     7/2005
  (Continued)

OTHER PUBLICATIONS

Patents Act 1977: Combined Search and Examination Report under Sections 17 and 18(3), UKIPO Application No. GB1606616.9, dated Sep. 27, 2016, 7 pp.
(Continued)

*Primary Examiner* — Kevin Hurley
*Assistant Examiner* — Maurice L Williams
(74) *Attorney, Agent, or Firm* — Carlson, Gaskey & Olds, P.C.

(57) ABSTRACT

A vehicle steering system includes an input configured to receive a signal representing a target steering angle, an output configured to provide a torque output command to a steering motor based on the target steering angle, and a torque limiter module configured to receive the torque output command and apply a torque limit thereto, prior to the torque output command being provided to the steering motor. The torque limit is configurable dynamically based on at least one vehicle parameter.

12 Claims, 3 Drawing Sheets

(58) Field of Classification Search
CPC .......... B62D 6/08; B62D 6/10; B62D 15/025; B60Y 2400/307
See application file for complete search history.

(56) References Cited

U.S. PATENT DOCUMENTS

| | | | |
|---|---|---|---|
| 2002/0007236 A1* | 1/2002 | Sadano | B62D 1/28 701/28 |
| 2002/0013647 A1* | 1/2002 | Kawazoe | B62D 1/28 701/41 |
| 2003/0045982 A1 | 3/2003 | Kondo et al. | |
| 2011/0010054 A1* | 1/2011 | Wilson-Jones | B62D 6/008 701/42 |
| 2011/0112724 A1* | 5/2011 | Kariatsumari | B62D 5/0463 701/41 |
| 2012/0046832 A1* | 2/2012 | Kariatsumari | B62D 5/0463 701/41 |
| 2012/0283913 A1 | 11/2012 | Lee et al. | |
| 2014/0222295 A1* | 8/2014 | Dornhege | B62D 6/002 701/42 |
| 2014/0277945 A1 | 9/2014 | Chandy | |
| 2015/0057890 A1* | 2/2015 | Tamaizumi | B62D 6/008 701/41 |
| 2015/0068833 A1* | 3/2015 | Takashima | B62D 5/046 180/444 |
| 2015/0158524 A1* | 6/2015 | Lee | B62D 1/28 701/41 |
| 2015/0183460 A1* | 7/2015 | Oyama | B62D 15/025 701/41 |
| 2015/0298728 A1* | 10/2015 | Yoda | H02K 5/173 180/422 |
| 2016/0052543 A1* | 2/2016 | Weinreich | B62D 6/00 701/41 |
| 2016/0121923 A1* | 5/2016 | Maeda | B62D 5/0463 701/41 |
| 2016/0159390 A1* | 6/2016 | Tamaizumi | B62D 5/0493 701/41 |
| 2016/0167701 A1* | 6/2016 | Sone | G01L 3/12 701/43 |
| 2016/0288831 A1* | 10/2016 | Lee | B60W 30/10 |
| 2017/0066472 A1* | 3/2017 | Wang | B62D 5/0463 |
| 2017/0183031 A1* | 6/2017 | Ko | B62D 6/002 |

FOREIGN PATENT DOCUMENTS

| | | |
|---|---|---|
| JP | 2009-190464 A | 8/2009 |
| JP | 2011-43884 A | 3/2011 |
| WO | WO 2011/002345 A1 | 1/2011 |
| WO | WO 2016/088704 A1 | 6/2016 |

OTHER PUBLICATIONS

International Search Report and Written Opinion of the International Searching Authority, International Application No. PCT/EP2017/058252, dated Jun. 16, 2017, 12 pp.

* cited by examiner

VEHICLE STEERING SYSTEM

RELATED APPLICATIONS

This application is a 35 U.S.C. § 371 national stage application of PCT Application No. PCT/EP2017/058252, filed on Apr. 6, 2017, which claims priority from Great Britain Patent Application No. 1606616.9, filed on Apr. 15, 2016, the contents of which are incorporated herein by reference in their entireties. The above-referenced PCT International Application was published in the English language as International Publication No. WO 2017/178330 A1 on Oct. 19, 2017.

TECHNICAL FIELD

The present disclosure relates to a vehicle steering system. Aspects of the invention also relate to a method, to a controller configured to implement the method, and to a vehicle equipped with the system.

BACKGROUND

New vehicles are often equipped with one or more Advanced Driver Assistance Systems (ADAS) that are designed to support driving tasks thereby enhancing the functionality of the vehicle. This can be achieved by advising, alerting and even intervening to regulate driving events thereby improving driving performance, safety and vehicle usability. Although ADAS features are usually built into the vehicle during manufacture, they may sometimes also be available for retrofit to existing vehicles. ADAS features are a focus of much research and development and are becoming ever more powerful as the ability of the vehicle to detect its surroundings and analyse its situation improves, such that increasing degrees of autonomy are achievable.

More recent developments in driver assistance systems include those which support semi-automated driving in which driver support is provided for an extended period of time. For example, an adaptive cruise control function (ACC) provides longitudinal vehicle control in which the speed of the vehicle is maintained at a driver-determined value whilst suitable sensor systems monitor the highway ahead to ensure that the vehicle does not approach too close to a vehicle in front. The driver workload is reduced as they no longer have to regulate brake and throttle inputs in response to factors such as gradients and approaching vehicles. This would be classified as a 'Level 1' system according to the SAE definition of automation levels. An ACC function may work in combination with, or independent of, another function that provides lateral vehicle control, for example a Lane Centring Assist (LCA) function, more generally known as a lateral assist function. In known lateral assist functions, on-board sensor systems, which may be camera-based, monitor the highway and feed a steering control system that ensures the vehicle remains in the centre of its lane. However, the driver is fully responsible for monitoring the environment and would need to control the vehicle collaboratively in scenarios where lane markings do not necessarily identify the correct driving line, for example during lane changes or if there was an obstruction such as roadworks in the lane. When combined with a longitudinal assist function such as ACC, this becomes a Level 2 system according to the SAE defined automation levels.

Further functionality and robustness may be added to provide a Level 3 system where the driver is no longer required to actively monitor the driving environment. However, such driver assist functions must allow for the driver the resume control at any time in response to driver intent or the vehicle leaving the conditions under which it can operate autonomously.

The transition and collaboration between human and system control need to be as smooth and consistent as possible to deliver features that are both satisfying and safe to use. It is against this background that the embodiments of the invention have been devised.

SUMMARY OF THE INVENTION

According to an aspect of the invention there is provided a vehicle steering system comprising an input configured to receive a signal representing a target steering angle; an output configured to provide a torque output command to a steering motor based on the target steering angle; and a torque limiter module configured to receive the torque output command and apply a torque limit thereto, prior to it being provided to the steering motor, wherein the torque limit is configurable dynamically based on at least one vehicle parameter.

Embodiments of the invention also relate to a method of controlling the torque output from a vehicle steering system, the method comprising receiving a signal indicative of a target steering angle; providing a torque output command to a steering motor based on the desired steering angle; and applying a torque limit to the torque output command, prior to the torque output command being provided to the steering motor, wherein the torque limit is configurable dynamically based on at least one vehicle parameter. In other aspects, the invention relates to a controller for a steering system for carrying out the step of the method as defined above, and also to a vehicle comprising a vehicle steering system as defined above or comprising a controller as defined above.

The embodiments of the invention are advantageous in that they improve the collaboration and interaction between human control of a vehicle and automated control of the vehicle by implementing a configurable limit on the torque that may be commanded from the steering motor to meet a target steering angle, as may be determined by an automated driving means, for example a lateral assist function, where the configurable limit is determined dynamically based on at least one vehicle parameter. This vehicle parameter may be related to driver control, for example a driver-applied steering input parameter.

The torque limit may reduce in proportion to the magnitude of the driver-applied steering input parameter. In the illustrated embodiments, the proportional reduction is a linear function, although it may also be configured to be non-linear.

So as to provide a further degree of control over the configurable torque limit, the torque limit may be further dependent on a steering angle error which is the difference between the target steering angle and an actual steering angle provided to a steering wheel of the steering system. Therefore, the torque limit is able to be configured to take into account increasing human control input into the steering system that results in the actual steering angle diverging from the target steering angle. Here, the steering angle error may form the basis of a weighting function which is used to vary the proportion to which the torque limit is applied compared to an upper torque threshold.

The driver-applied steering input may be based on an output from a torsion bar sensor of the steering system, the torsion bar sensor being operable in response to a driver input at the steering wheel.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

In the description that follows of specific embodiments of the invention, numerous specific features will be discussed in detail in order to provide a thorough understanding of the inventive concept as defined in the claims. However, it will be apparent to the skilled person that the invention may be put in to effect without the specific details and that in some instances, well-known methods, techniques and structures have not been described in detail in order not to obscure the invention unnecessarily.

In this description, references to a functional block or module should be understood as referring to software code for performing the function or action specified in which a control output is provided in response to one or more inputs. Code may be in the form of a software routine or a function that is called by a main program, or also may be code forming part of a flow of code not being a separate routine or function. Reference to a functional block is made here for ease of explanation of the way in which the controller operates.

References will be made in this description to the term 'torque', which is to be interpreted with its normal meaning as being a turning force with S.I. units of Nm.

Figure 1:
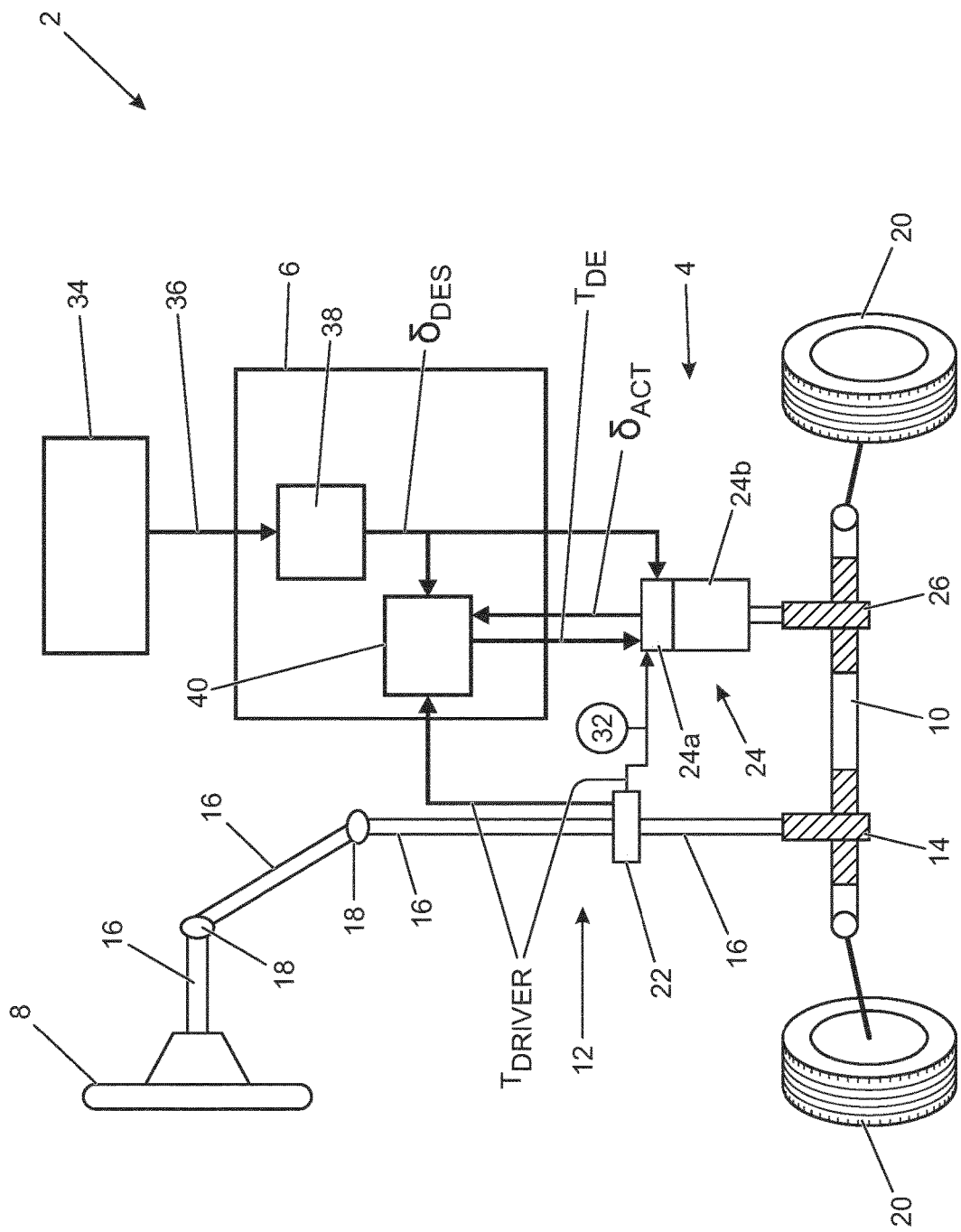
FIG. 1 is a schematic representation of a vehicle with a steering system in accordance with embodiments of the invention.

With reference to FIG. 1, a vehicle 2 includes an electronic power assisted steering (EPAS) system 4 and an automated steering controller 6 interfaced to the EPAS system 4. It should be noted at this point that where controllers and functional modules are described, this is to explain the functionality carried out by those components and does not imply either physical separation of hardware. For example, all of the functions carried out by the modules and controllers mentioned herein implemented in a single execution environment, functionally separated as appropriate.

The EPAS system 4 comprises a steering wheel 8 that is coupled to a steering rack 10 through a steering shaft 12 (also called a torsion bar) and a gear 14. To enable the steering shaft 12 to take an indirect route to the steering rack 10, the steering shaft 12 may comprise a plurality of shaft portions 16 coupled together by suitable rotatable joints 18. The gear 14 may be a pinion that converts the rotation of the steering shaft 12 to lateral movement of the steering rack 10, as is a known configuration of steering system.

A pair of road wheels 20 are coupled to respective ends of the steering rack 10. As would be well understood, the steering angle of the road wheels 20 is varied by movement of the steering rack 10 as controlled by rotation of the steering wheel 8. Conventionally, the steering angle of the road wheels 20 and also of the steering wheel 8 is represented by the symbol δ which is zero at a straight-ahead position.

A torque sensor 22 is associated with the steering shaft 12 and is operable to measure the torque applied by the driver (driver applied torque, $T_{DRIVER}$) to the steering wheel 8 and may also provide a measure of steering wheel position and/or steering angle. Such sensors are known technology. Other sensing techniques may also be used to provide a suitable measurement of driver applied torque at the steering shaft 12.

Power steering assistance is provided by an EPAS motor and control module 24 which will be referred to simply as the EPAS module 24 from now on. The EPAS module 24 includes an EPAS controller 24a and an EPAS motor 24b in an integrated package although this need not be the case and the two components may be separate. The EPAS module 24 is coupled to the steering rack 10 by associated gearing 26 so that additional torque can be applied to the steering rack 10 in addition to the driver applied torque. Other configurations are possible, for example power assistance based on hydraulics. As will be described, the EPAS module 24 can also operate in a normal driving mode or autonomously without the input from the steering shaft 12. It the interaction between these modes of operation that is the focus of this description.

The EPAS module 24 receives input from the torque sensor 22 and also receives further data from additional sensors, labelled here as 32, such as vehicle speed and actual steering angle, that is to say the steering angle as indicated by the steering rack 10 and, thus, the road wheels 20. The actual steering wheel angle may be measured at various points as would be known to the skilled person. The EPAS module 24 is provided with a measure of driver applied torque, $T_{DRIVER}$, from the torque sensor 22 and, based on this information and on-board algorithms and look-up tables, the EPAS module 24 determines an assistance torque, $T_{MOTOR}$, with which to drive the steering rack 10 via the integrated electric motor 24b, during a normal mode of operation where the automatic driving function is not enabled such that the EPAS module 24 operates in the usual way by providing steering assistance to the steering input of the driver.

In circumstances where an automatic driving function of the vehicle is enabled, the EPAS module 24 is also responsive to an alternative steering command generated by the automated driving controller 6, as will be described.

The automated driving controller 6 is interfaced to a forward-looking sensor system, which in this embodiment is a camera system 34 of the vehicle 2. Such camera systems are known in the art as being used in driver assist functions such as 'lane centring assist' (LCA) and other autonomous driving routines and so will not be described in further detail here. The camera system 34 images the road ahead of the vehicle and determines the current position of the vehicle in the road and data relating to the trajectory of the vehicle. The camera system provides road trajectory and vehicle position information to the automated driving controller 6 via data signal 36.

The automated driving controller 6 comprises two main functional modules having the responsibility for interpreting the road trajectory and vehicle position data signal 36 and determining the desired or 'target' steering angle that is required to maintain the position of the vehicle on the road, but also to control the way in which the influence of the automated driving controller 6 interacts with the steering input from the driver. Firstly, the automated driving controller 6 includes a lateral control module 38 that implements suitable algorithms that interpret the data signal 36 and outputs a desired or 'target' steering angle $\delta_{DES}$. Such functionality is generally known in the art and will not be described further here.

The automated driving controller 6 also includes a dynamic limit calculation module 40, the function of which is to ensure that the amount of motor torque that is applied to the electric motor 24b, in the form of a torque output command, to achieve a desired steering angle is suitably limited in all circumstances. Typically, such limits are hard coded static values, but such an approach can result in an unrefined interaction between lateral control of the vehicle as governed by the automated driving controller 6 and the driver of the vehicle.

The automated driving controller 6 outputs two signals to the EPAS module 24: a desired steering angle $\delta_{DES}$ and a configurable driver equivalent torque limit $T_{DE}$.

Figure 2:
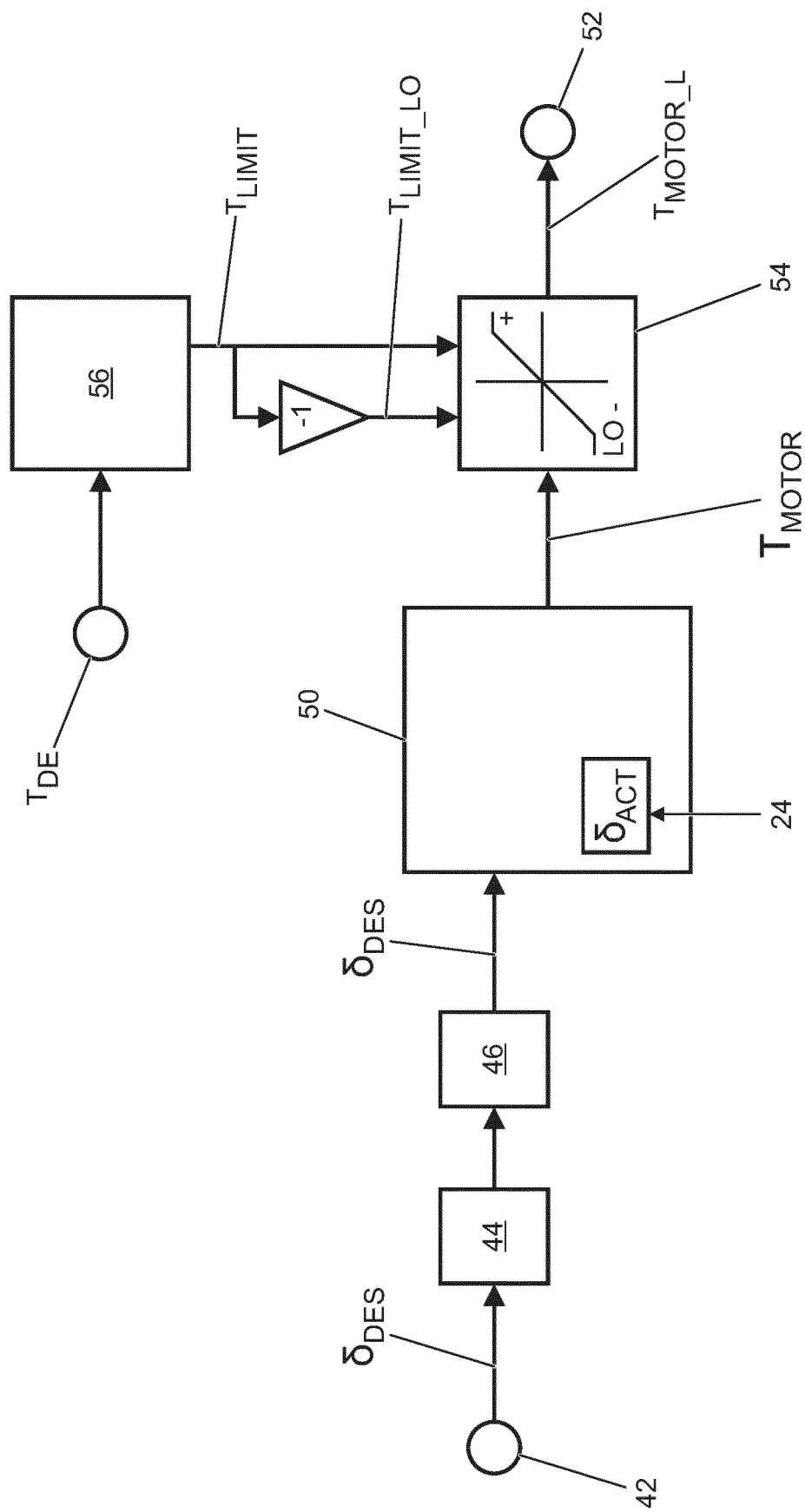
FIG. 2 is a functional block diagram of the functionality implemented by the steering system.

Reference will now be made to FIG. 2 that illustrates the control methodology implemented by the EPAS module 24 in response to the signals provided by the automated driving controller 6.

The desired steering angle $\delta_{DES}$ is received by the EPAS module as input signal 42 and is fed through an absolute limit unit 44 and a rate limit unit 46, respectively, before being input into a position control algorithm block 50. The two limit units 44,46 serve to check the validity of the input signal 42 to ensure that it is within preset permissible bounds.

The position control algorithm block 50 has the function of calculating a motor torque value $T_{MOTOR}$ that is applied to the electric motor 24b as output signal 52. The control algorithm block 50 knows the actual steering angle $\delta_{ACT}$ as an internal state since it is integrated with the electronic motor 24b and so the motor torque value $T_{MOTOR}$ is calculated to ensure that the actual steering angle $\delta_{ACT}$ is driven towards the desired steering angle $\delta_{DES}$. Such an algorithm may be suitable feedback control logic appropriately designed to provide the desired response and may be based around a PID (proportional-integral-derivative) or similar control routine.

The motor torque signal $T_{MOTOR}$ output from the position control algorithm block 50 is fed through a dynamic limit function 54, also referred to as a 'torque limiter module' which applies a variable motor torque limit value $T_{LIMIT}$. The resulting torque value output is indicated as $T_{MOTOR\_L}$. The result of this is that the motor torque $T_{MOTOR\_L}$ that is applied to the electronic motor 24b of the EPAS module 24 as a contribution of the automated driving controller 6 is regulated in circumstances where the driver also applies a steering input to the steering wheel 8, as will be described in further detail below. Therefore, this ensures a smooth interaction when steering authority passes between the automated driving controller 6 and the driver. In this way, the driver does not get excessive and potentially misleading feedback from the steering wheel 8.

The configurable motor torque limit value $T_{LIMIT}$ may be calculated in the following way.

As has been described above, the dynamic limit calculation module 40 of the automated steering controller 6 outputs a limit value of driver equivalent torque $T_{DE}$ and this is input into a torque limit conversion module 56. The torque limit conversion module 56 converts the torque limit from a 'driver equivalent torque' value, $T_{DE}$, to a comparable value of torque at the motor $T_{LIMIT}$. Here, the term 'driver equivalent torque' should be considered to be the torque value provided by the automated driving controller 6 that is equivalent to a torque applied by the driver on the steering shaft 12 in order to achieve the desired steering angle as commanded by the lateral control module 38. The relationship between a value of driver equivalent torque, in this case limit value $T_{DE}$ and the corresponding value of torque at the motor, in this case $T_{LIMIT}$ is a multivariate non-linear function, factoring in vehicle seed, steering wheel angular velocity and power assistance curve calibrations that are known to the EPAS controller 24b.

The motor torque limit $T_{LIMIT}$ output from the torque limit conversion module 56 is split into two signals, one of which is inverted so as to provide an equal and opposite torque limit value $T_{LIMIT\_LO}$. The two torque limit values simply represent the torque limit applied to the motor torque when being driven in opposite directions, that is to limit the magnitude of the motor torque irrespective of the direction of rotation.

Determination of the Torque Limit

Figure 3:
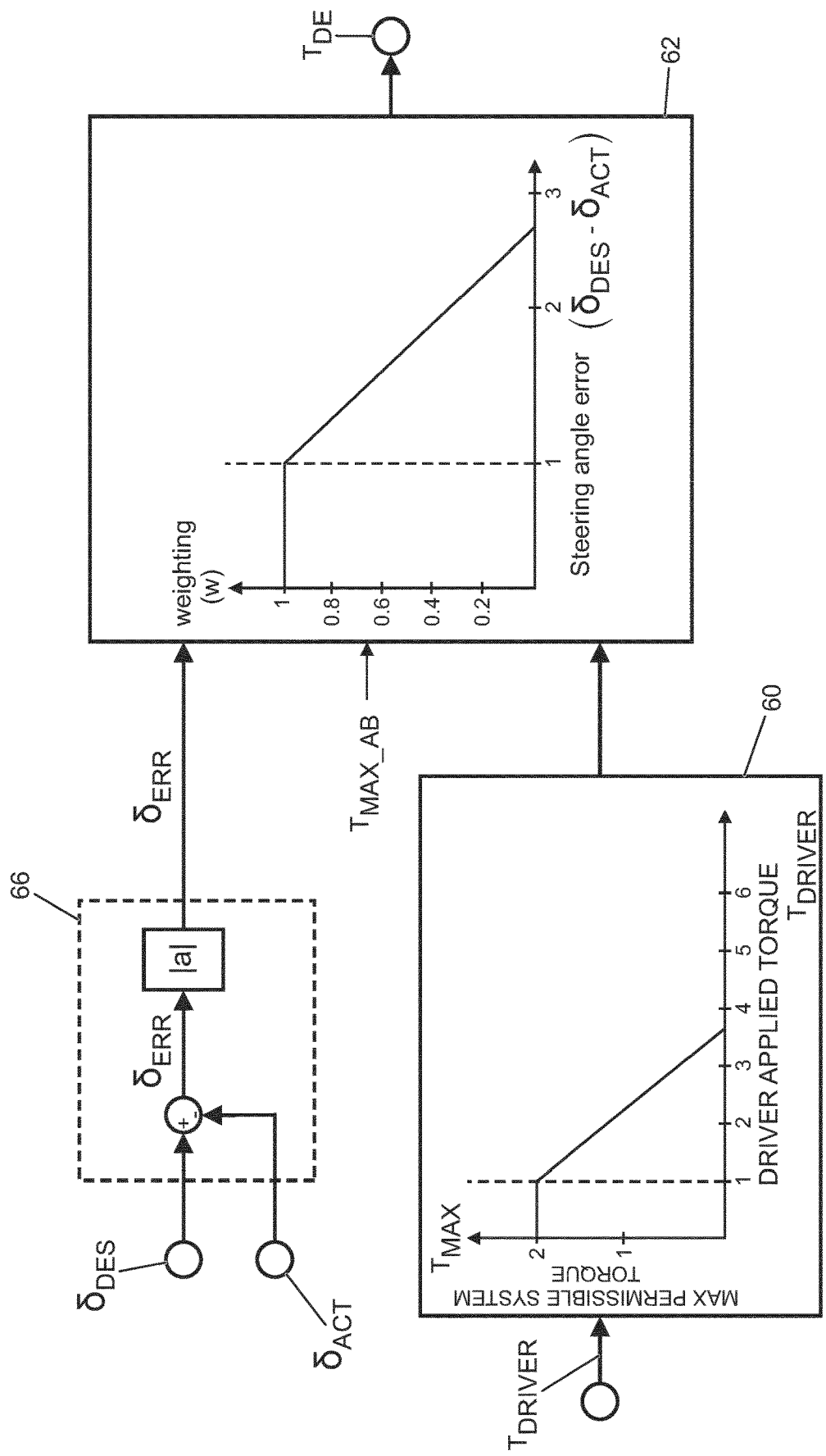
FIG. 3 is a further functional block diagram of functionality embodied by the steering system.

As has been mentioned above, the dynamic limit calculation module 40 of the automated driving controller 6 is responsible for setting the motor torque limit $T_{LIMIT}$ by providing a dynamically varying value of driver equivalent torque limit $T_{DE}$, which is then converted into a limit to be applied at the motor torque. The functional block diagram of FIG. 3 illustrates the methodology implemented by the dynamic limit calculation module 40 in more detail.

The dynamic limit calculation module 40 receives three input signals: a desired steering angle $\delta_{DES}$, as determined by the lateral control module 38; an actual steering angle $\delta_{ACT}$ as determined by the EPAS module 24 and derived from the operation of the electric motor 24b acting on the steering rack 10; and also a driver applied steering input parameter, being a torque signal, $T_{DRIVER}$, from the torque sensor 22 associated with the steering shaft 12.

The general function of the dynamic limit calculation module 40 is to regulate the maximum amount of torque that can be applied to the steering rack 10 by the electric motor 24b during automatic control of the vehicle 2 based on whether and to what extent the driver of the vehicle 2 provides steering input at the steering wheel 8. In effect, therefore, the influence of the automatic driving controller 6 is reduced by virtue of the configurable torque limit as the driver begins to increase the steering input. This is advantageous in circumstances where the driver begins to take control of the vehicle in order to control the vehicle to take a different direction to the trajectory being followed by the automatic driving controller 6 based on the camera system 34. As the driver steering input increases, thereby increasing driver applied torque, the configurable torque limit is reduced which reduces the maximum torque able to be applied by the automatic driving controller 6. At a predefined point, the limit will be reduced substantially to zero, thereby providing full authority to the driver.

In this embodiment, the dynamic limit calculation module 40 includes a first submodule 60 and a second submodule 62. The first submodule 60 receives as an input signal the driver applied torque $T_{DRIVER}$ from the torque sensor 22 and, in response, outputs a value of maximum permissible system torque $T_{MAX}$ which it is determined the system should be able to apply to the steering rack 10 via the electric motor 24b. The relationship between the two values is illustrated by the graph inset within the first submodule 60 in FIG. 3.

In the graph, the X-axis is driver applied torque $T_{DRIVER}$ and the Y-axis is the maximum permissible system torque $T_{MAX}$. At values of driver applied torque $T_{DRIVER}$ between 0 and 1 Nm, the maximum permissible system torque value $T_{MAX}$ is a constant at 2 Nm. This means that for small applications of torque to the steering wheel 8, the torque limit would not be reduced by the system. It should be noted that this constant value may be any value, in principle, and as such would be a configurable parameter. However, 2 Nm is provided here as an example of a realistic driver equivalent torque value that an automated driving function, such as lane centring assist (LCA), should be able to apply to the steering rack 10 through the electric motor 24b. However, between values of driver applied torque $T_{DRIVER}$ of 2 Nm and approximately 3.5 Nm, the maximum permissible system torque value $T_{MAX}$ reduces proportionally. From the above explanation, therefore, it will be appreciated that the maximum permissible system torque $T_{MAX}$ determined by the first submodule 60 reduces in proportion to the magnitude of the increase in driver applied torque $T_{DRIVER}$, but includes a margin to allow for minor perturbations of the steering wheel 8. In practice, therefore, this means that the steering control input provided by the automated driving controller 6 is reduced as the driver begins to steer the car.

The purpose of the second submodule 62 is to regulate to what degree the maximum permissible system torque $T_{MAX}$ is applied as the driver equivalent torque limit $T_{DE}$ based on the error between the desired steering angle $\delta_{DES}$ and the actual steering angle $\delta_{ACT}$. The angle error is represented in FIG. 3 as $\delta_{ERR}$ and is calculated by difference unit 66. In effect, the second submodule 62 ensures that the reduction in the torque limit only takes place in appropriate scenarios, as will be described later. Once again there is threshold within which small perturbations in angle error do not affect the output.

In the graph, the X-axis represents steering angle error $\delta_{ERR}$, as discussed above, and the Y-axis represents a weighting of $T_{MAX}$ against the maximum absolute torque limit, or upper torque threshold, identified here as $T_{MAX\_AB}$. As can be seen, for steering angle error values between 0 and 1 (units of degree), the weighting (w) is 1 which corresponds to a 100% weighting towards $T_{MAX\_AB}$. As a result of this, the second submodule 62 simply outputs the value $T_{MAX\_AB}$ as the driver equivalent torque limit $T_{DE}$ to the EPAS module 24 for subsequent conversion into the configurable motor torque limit $T_{LIMIT}$ as discussed above. However, at angle error values greater than 1 degree, the weighting between $T_{MAX}$ and $T_{MAX\_AB}$ is determined by a predetermined gradient that reduces in proportion to the steering angle error. Here the ratio is shown reducing to zero at a steering angle error value of approximately 2.3 degrees, merely by way of example. Although it is envisaged that the function that the weighting performs could be carried out in different ways in order to regulate the torque limit in dependence on the steering angle error, in this embodiment the weighting is implemented as $T_{DE}=(w*T_{MAX\_AB})+((1-w)*T_{MAX})$.

In effect, therefore, the second submodule 62 implements a weighted average function that determines the degree of authority to provide the maximum permissible system torque value $T_{MAX}$ as determined by the first submodule 60. For angle error values between 0 and 1, the torque limit is set at the upper torque threshold $T_{MAX\_AB}$, which in this embodiment is set as 2 Nm (i.e. the weighting is 100% towards $T_{MAX\_AB}$). This corresponds to driving scenarios in which it would be undesirable to reduce the torque input provided by the automated driving controller 6 so the torque limit is effectively set at its maximum value.

At angle error values above 1 degree, the weighting is gradually transferred from $T_{MAX\_AB}$ towards $T_{MAX}$ as calculated by the first submodule 60. It will therefore be appreciated that at angle error values above 2.3 degrees, in this embodiment, the output is weighted 100% towards the maximum permissible torque value $T_{MAX}$. This corresponds to driving scenarios in which significant departures of the actual steering angle $\delta_{ACT}$ as determined by the driver moving the steering wheel 8 causes the steering angle error $\delta_{ERR}$ to increase significantly which results in the influence of the automatic driving controller 6 to provide steering assistance being reduced to zero.

By way of example, consider two operational scenarios of the vehicle during which the vehicle is being guided by the automated driving controller 6 implementing a lane centring assist function based on information received from the camera system 34:

Scenario 1—the vehicle is travelling in a lane of a road or highway under the control of the automated driving controller 6 such that the EPAS module 24 is responsive to the desired steering angle $\delta_{DES}$ provided by the automated driving controller 6. The driver then makes a decision to diverge away from the current path, for example either to change lane or perhaps to turn off the highway. In such a situation, the driver will provide a significant steering input through the steering wheel 8 and the assistance from the automated driving controller 6 will no longer be desirable. Such a scenario is detectable since the actual steering angle $\delta_{ACT}$ as determined by the driver will be different to the desired steering angle $\delta_{DES}$ as determined by the automated driving controller 6 which tries to follow the lane ahead of the vehicle. Therefore the error between the desired steering angle $\delta_{DES}$ actual steering angle $\delta_{ACT}$ increases. In such a situation, the increase in steering angle would result in the weighting function (w) biasing the output is towards the maximum permissible torque value $T_{MAX}$, thereby resulting in the influence of the automatic driving controller 6 to provide steering assistance being reduced to zero.

Scenario 2—the vehicle is travelling in a lane of a road or highway under the control of the automated driving module 6 such that the EPAS module 24 is responsive to the desired steering angle $\delta_{DES}$ provided by the automated driving controller 6. However, the radius of curvature of the road becomes tighter than the automated driver controller 6 has the authority to follow successfully. Therefore, the driver must make an additional steering input to the steering wheel 8 in order to maintain the vehicle in its position on the road. This means that although the driver is providing a steering input to the steering wheel, the actual steering angle $\delta_{ADT}$ is substantially equal to the desired steering angle $\delta_{DES}$ within a certain tolerance, for example 1 degree of steering angle. In such a situation, where the driver is required to make a steering input in addition to the steering control provided by the automated driving controller 6, it would not be desirable to reduce the influence of the automated driving controller 6 since this would result in the driver needing to make a further course correction.

Thus, the second submodule 62 functions to take account of the two scenarios explained above and therefore provides a means to influence the weighting given to the maximum permissible torque limit $T_{MAX}$, which is output as $T_{DE}$, based on the monitoring of further system conditions, which in this case is the steering angle error $\delta_{ERR}$. This relationship is illustrated by the graph inset within the second submodule 62 in FIG. 3.

Many modifications may be made to the above examples without departing from the scope of the present invention as defined in the accompanying claims.

In the above embodiments, reference has been made to steering angle values used as input signals. It should be noted that although these might be direct measurements of steering angle, they may also be any value that is indicative of the steering angle. For example, such values might be the position of the steering rack 10, the angular direction of the road wheels 20 or some other equivalent value. Therefore, references to the term 'steering angle' should be interpreted to mean any measurement that is indicative of the steering angle of the wheels.

The invention claimed is:

1. A vehicle steering system comprising
a power assisted steering module including
a steering motor and
a motor controller for:
receiving a signal representing a target steering angle to automatically maintain a position of the vehicle on a road;
calculating, from the target steering angle, a motor torque value to be applied to the steering motor for controlling the steering motor;
maintaining the motor torque value while a driver-applied steering input parameter is below a non-zero first threshold;
limiting the motor torque value to reduce an influence of the signal in linear proportion to an increase in the driver-applied steering input parameter when the driver-applied steering input parameter is above the first threshold and below a second threshold that is higher than the first threshold; and
reducing the motor torque value substantially to zero when the driver-applied steering input parameter reaches or exceeds the second threshold,
wherein limiting the motor torque value is further dependent on a steering angle error comprising a difference between the target steering angle and an actual steering angle provided to a steering wheel of the steering system.

2. The vehicle steering system of claim 1, wherein the driver-applied steering input parameter is a torque parameter communicated to the power assisted steering module.

3. The vehicle steering system of claim 1, wherein if the driver-applied steering input parameter corresponds to a divergence from a current path of the vehicle according to the target steering angle, the motor torque value is reduced to zero.

4. The vehicle steering system of claim 1, wherein the first threshold is based on the driver-applied steering input parameter resulting from a steering input from the driver that corresponds, within a predetermined tolerance, to the target steering angle.

5. The vehicle steering system of claim 1, wherein the driver-applied steering input parameter is based on an output from a torsion bar sensor of the steering system, the torsion bar sensor being operable in response to a driver input at the steering wheel.

6. A vehicle comprising a vehicle steering system as claimed in claim 1.

7. A vehicle steering system comprising
a power assisted steering module including
a steering motor and
a motor controller for:
receiving a signal representing a target steering angle to automatically maintain a position of the vehicle on a road;
calculating, from the target steering angle, a motor torque value to be applied to the steering motor for controlling the steering motor;
maintaining the motor torque value while a driver-applied steering input parameter is below a non-zero first threshold;
limiting the motor torque value to reduce an influence of the signal in linear proportion to an increase in the driver-applied steering input parameter when the driver-applied steering input parameter is above the first threshold and below a second threshold that is higher than the first threshold; and
reducing the motor torque value substantially to zero when the driver-applied steering input parameter reaches or exceeds the second threshold,
wherein the first threshold is based on the driver-applied steering input parameter resulting from a steering input from the driver that corresponds, within a predetermined tolerance, to the target steering angle.

8. The vehicle steering system of claim 7, wherein the driver-applied steering input parameter is a torque parameter communicated to the power assisted steering module.

9. The vehicle steering system of claim 7, wherein limiting the motor torque value is further dependent on a steering angle error comprising a difference between the target steering angle and an actual steering angle provided to a steering wheel of the steering system.

10. The vehicle steering system of claim 7, wherein if the driver-applied steering input parameter corresponds to a divergence from a current path of the vehicle according to the target steering angle, the motor torque value is reduced to zero.

11. The vehicle steering system of claim 7, wherein the driver-applied steering input parameter is based on an output from a torsion bar sensor of the steering system, the torsion bar sensor being operable in response to a driver input at the steering wheel.

12. A vehicle comprising a vehicle steering system as claimed in claim 7.

* * * * *